May 23, 1961 H. A. THOMAS 2,985,099
TREATING HIGH SOLIDS SLUDGES
Filed Oct. 31, 1957
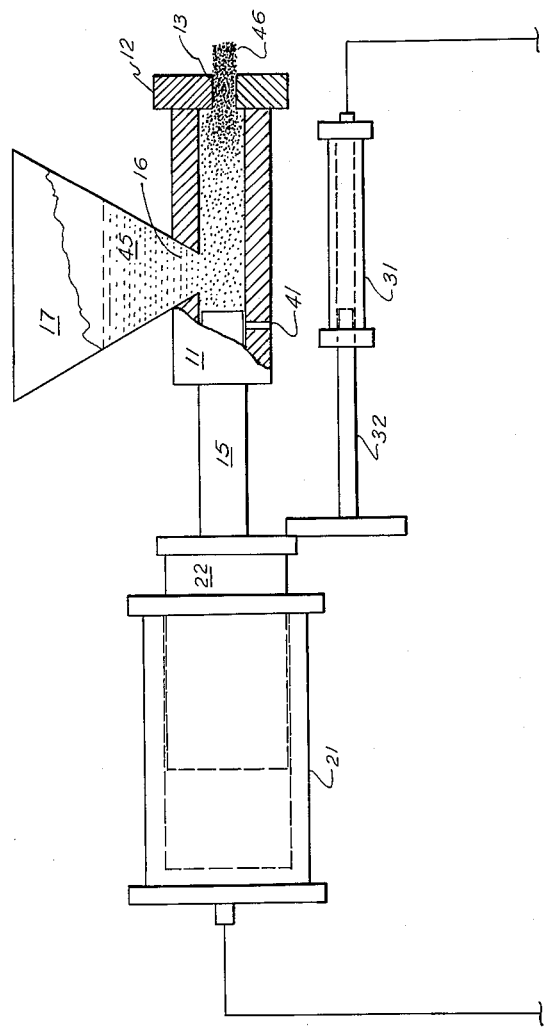

United States Patent Office 2,985,099
Patented May 23, 1961

---

2,985,099

TREATING HIGH SOLIDS SLUDGES

Henry A. Thomas, Baton Rouge, La., assignor to Ethyl Corporation, New York, N.Y., a corporation of Delaware Filed Oct. 31, 1957, Ser. No. 693,660

2 Claims. (Cl. 100—37)

This invention relates to the processing of high solids sludges. More specifically, the invention relates to the treatment of sludges of high solids content, the solids thereof being predominantly malleable metals, to segregate the liquid therefrom and form the metal solids into cohesive solid shapes.

Various methods of processing industrial sludges have been utilized heretofore to resolve the liquid and the solid phases for recovery and subsequent processing of these separate components. For example, sludges can be dried or dewatered by various means. In some instances, for example, the sludges from organo-metallic processes, such as in the process for manufacturing tetraethyllead, the degree of recovery of the lead metal content from process sludges is a critical factor in the economics and effectiveness of the overall operation. Heretofore, sludges of this type have normally been dried in steam heated driers to eliminate the liquid phase and prepare the lead content for smelting. It has been found, however, that high solids sludges of this type can be very effectively resolved into a liquid phase and a solids phase and the recovered solids smelted without a thermal drying operation. This nonthermal operation involves the extrusion of the metal solids into cohesive rod-like bars or shapes, and, concurrently with such extrusion, the release of substantially all the liquid phase or phases from the solids content. In addition to being a moderate temperature operation, this technique results in the production of the metals content in a massive form which is particularly suitable for smelting, whereas the finely divided dusts and powder from a thermal drying operation are much more difficult to smelt and are more readily oxidizable.

The foregoing technique is very effective, but in numerous cases, certain ancillary problems have been introduced. It has been found that high extrusion ratios are difficult to provide for reasons described below. By extrusion ratio is meant the cross sectional ratio of an extrusion chamber (or, of a charge to be extruded) to the cross sectional area of the extrusion aperture or die. The reason for the limited range of effective extrusion ratios arises from the fact that the extrusion operation as applied to high solids sludges is substantially different in nature than extrusion of materials which are sufficiently plastic to exhibit essentially hydraulic properties within the extrusion chamber. Thus, when a soft material such as spaghetti paste is processed, pressure applied on the charge by an extrusion ram is transmitted throughout the zone on familiar hydraulic principles. In other words the shear resistances of the material do not play an important part. Hence, it is quite practical to employ quite high extrusion ratios, which in turn permits relatively high production in that a large charge can be processed with each extrusion stroke.

In the present situation, viz., the processing of high metal solids sludges at normal temperatures, the situation is appreciably different. The high extrusion ratios cannot be easily provided because pressures required to cause extrusion through a die increase with the increases in extrusion ratio. As a result, then, it has been found necessary to limit extrusion ratio values to the order, generally, of from about one and one-half to, usually, not more than fifty. A more desirable range of extrusion ratios however, is from about 3 to 30. Another factor of great significance is the necessity of employing extrusion chambers which are relatively short compared to the transverse area of the chamber. This limitation arises because of lack of easy flowability of the sludges processed. Thus, if a long narrow chamber were used, it would be extremely difficult to provide a full charge of raw sludge by flowing into the chamber.

As a result of this combination of factors, processing installations of sludges of the character described have been subject to severe production limitations which threaten their applicability. In other words, because of the combined limitations of the necessity for relatively low extrusion ratio, and also the limitation of length of an extrusion chamber to the cross section thereof, plus the relatively high pressure required for at least a portion of the operation, the capacity of any given process installation has heretofore been appreciably restricted.

It is, accordingly, an object of the present invention to provide a new and improved technique for the dewatering of high solids sludges and for the production of the solids content thereof into valuable or readily treatable rod-like shapes. A more specific object of the present invention is to provide a process for treating high solids sludges, particularly of the lead particle type, which provides differentiated types of pressure application to the sludges processed. An additional object is to provide a process having differentiated pressure cycle portions including a low pressure operation particularly susceptible to rapid processing. Another object is to provide a process which avoids the operating limitations described above. Other objects will appear hereinafter.

The details of the process of the invention and the various forms thereof will be readily understood from the following description and from the figure, which is a schematic representation of apparatus suitable for carrying out the present process, including a hydraulic system in part, for applying the working forces to the process.

The process of the invention involves, in its broadest terms, providing a plurality of discrete charges of the high solid sludge, and pressing these charges at a low pressure, preferably rapidly applied. These treated charges are cumulated and then subjected to a relatively high pressure and the solids are extruded through an appropriate extrusion die as a substantially solid, liquid free bar. The pressures applied in the low pressure operation are below the incipient extrusion pressures for the sludge solids, and usually amount to from about 5 to about 25 percent of the final pressures. These initial pressures are discovered to be adequate to remove a large portion of the liquid present in the sludge, without any appreciable deformation of the solids present. Further, it is found that volume restriction of the initial treating, resultant from removal of a large part of the liquid phase, can be accomplished at a high rate, of the order of ten or more times the rate of processing in the final step. The individual charges thus treated can be, preferably, cumulated in the same chamber, or can be processed in a plurality of separate units and then cumulated.

The terminal or extrusion step of the operation is characterized by plastic deformation of the metal particles of the sludge feed. As stated above, the initial low pressure pressing operations are carried out at pressures below the incipient extrusion pressures, which vary according to the physical characteristics of the metal comprising the solids of the sludge, and also with the extrusion ratio to be employed. Generally, in processing sludges composed substantially of finely divided lead particles in a predominantly aqueous phase, the pressures applied in the initial step of the operation for an extrusion ratio of from about 3:1 to about 30:1 are of the order of from about 400 to about 2000 pounds per square inch. In such instances, also, the final treating pressure is usually in the range of above about 11,000 pounds per square inch pressure and up to about 26,000 pounds. Considerable latitude in extrusion ratio is permissible, but extrusion ratios of the range of from about 3:1 to about 30:1 are generally employed in the extrusion of the pressed mass from the initial treatment.

Another significant feature of the invention is the proportions of the extrusion chamber length to its internal transverse dimensions. By extrusion chamber length is meant its maximum length when the reciprocating ram therein is retracted the maximum distance from the die or discharge end. Generally, it is found that, for cylindrical cross section chambers, the proportions, or ratio of length to diameter, should be from about 8:1 to 1:1, although a much preferred range is from 6:1 to about 2:1.

By high solid sludges is meant, generally, systems wherein the solid particles comprises at least about one-fifth the volume of the sludge, and frequently above about one-third part by volume. The weight proportions, for such sludges, will vary with the intrinsic density of the metals and liquids involved. In the case of sludges from the manufacture of organolead compounds, to which the process is particularly adaptable, the most common sludges processed will contain at least about 80 percent by weight lead, the remainder being a liquid phase including a predominantly water phase plus variable quantities of liquid alkyllead compounds.

It will be understood that the present process is not limited in application to the operation of any specific apparatus and in fact a wide variety of devices can be employed for performing the essential processing steps, all of these devices including a chamber having means for applying pressure to the contents thereof, and for the final step of the operation an extrusion chamber for receiving the initially prepared and pre-compressed mass, and having an aperture or extrusion die for release of the solids portion of the charge. For purposes of illustration, however, the apparatus schematically illustrated in the accompanying figure is of the type wherein a single chamber is used, both for the initial treatment of a plurality of charges, and for the extrusion of the solids in the final step of the process.

Referring to the figure, typical apparatus includes an extrusion chamber or barrel 11, which is essentially a thick-walled tube having a closure plate 12 at one end thereof, said closure plate including an extrusion aperture or die 13. Closely fitting in the chamber 11 is a plunger or ram 15 capable of reciprocating movement through substantially the entire length of the chamber 11, by application of appropriate forces. Within the chamber 11 of the extruder is also a port 16 and a feed hopper 17 which is fitted adjacent the feed port 16.

Typical devices for causing movement of the plunger 15 include, for example, hydraulic cylinder piston units 21, 31. In the installation as shown, two such units are employed, a large diameter hydraulic cylinder-piston unit 21, and a small diameter cylinder-piston unit 31, having pistons 22, 32 actuated by flow of suitable hydraulic liquid to and from the cylinders 23, 33 thereof. The pistons of the hydraulic cylinder-piston units 21, 31 are mechanically linked or affixed to the end of the plunger or ram 15 of the extruder equipment.

In general operation of the process, employing the apparatus of the figure shown, sludge is introduced in the hopper 17. The ram 15 is retracted to allow a charge of the sludge to enter through the port 16 and fill or partially fill the chamber 11. The plunger 15 is moved forward (i.e., toward the closure plate 12) thrusting the raw charge in that direction. This movement is carried out at moderate pressures sufficient to push the lead solid particles as closely together as possible without appreciable deformation thereof. This movement is accompanied by the expression of substantial portions or fractions of the liquid phases present in the raw sludge. Removal of the liquid phase from the chamber 11 is accomplished by flow of the liquid around the face of the plunger 15 and out the drain port 41, and also by the flow of minor amounts through the die 13. As already stated, the pressure applied to the charge by the plunger or ram 15 in this portion of the operation is moderate, e.g., of the order of from about 500 pounds per square inch to about 2000 pounds per square inch in the case of processing a lead sludge from a tetraethyllead operation. The ram 15 is then retracted and another charge is introduced to the chamber 11 from the contents within the hopper 17. Several repetitions of this treatment may follow, the number thereof being dependent upon the amount of solid material which is accumulated within the chamber 11, the time required for additional repetitions, and the proportions of the chamber 11. Generally at least two separate charges are serially provided before the final extrusion stroke, but frequently a total of five to ten serially introduced charges are used. Feed of sludge to the chamber 11 may be accomplished by a variety of techniques, for example, by the gravity flow alone of sludges having low internal friction. In other instances, manual or mechanically applied ramming or pushing operation is necessary.

Upon completion of this low pressure processing of the plurality of charges, a final maximum pressure stroke of the ram 15 is applied, resulting in extrusion of the lead solids through the die 13 as a substantially homogeneous bar 46.

To further illustrate typical embodiments of the process of the invention, the following are examples of typical embodiments of the process. As already stated, a typical material processed is a lead solids sludge, as in the example below.

*Example 1*

A supply of sludge 45 of the following weight composition was provided in the hopper 17:

| | Percent |
| --- | --- |
| Lead particles | 83 |
| Aqueous phase | 12 |
| Tetraethyllead | 5 |

The solid lead particles were finely divided comminuted particles varying in size from about 0.005 to about 0.05 of an inch in diameter. In operation, ram 15 was retracted sufficiently to permit a first charge of the sludge to be introduced into the chamber 11, the volume of the sludge being approximately equal to the unfilled volume thereof. Forward movement of the ram 15 was then started, a pressure of approximately 500 pounds per square inch being thus applied to the charge. Under this force, a substantial portion of the liquid phases, amounting to about 75 percent by weight of that initially present, was expressed and was forced backwards past the ram 15. In this instance, back flow of liquid past the ram 15 was made possible by a moderate clearance, between the ram 15 and the internal walls of the chamber 11, amounting to about 0.001 inch per inch of diameter. A portion of the liquid was also expressed through the orifice or aperture 13. The application of this pressure was insufficient to cause deformation and flow of lead particles through the die 13, the die 13 having a diameter at its minimum opening so as to form an extrusion ratio of 7:1 with relation to the internal diameter of the chamber 11. The ram 15 was then again retracted, an additional portion of sludge was introduced into the open space in the chamber 11 and the precompression stroke was repeated. The open space in the chamber 11 established was only about two-thirds of the original available volume, owing to presence in the chamber of the first charge. The second charge was again pressed under a pressure of about 500 pounds, and the ram 15 again retracted, this time establishing a chargeable space of about 45 to 50 percent of the original chamber volume, owing to the cumulation of the first and second pressed charges. An additional, or third fresh charge was then introduced, and again pressure of 500 pounds was applied. Upon completion of this cumulation of three charges, the chamber was about 60-65 percent full. The pressure applied by the ram 15 was increased to about 14,500 pounds at this time. This pressure was accompanied by further removal of substantially all the remaining liquid phases (including both the aqueous and the tetraethyllead liquid) and by the transmittal through the extrusion die 13 of an apparently homogeneous solid bar-like product 46 which upon analysis showed a liquid content of only 1.6 percent by weight. In other words the total solids, predominantly lead, was 98.4 percent.

In the foregoing example, the movement of the ram 15 during the initial operations was approximately 10 times the rate during the final extrusion operation. The following example shows the processing of the same sludge by the previous method, that is, without cumulating a series of separate charges.

*Example II*

A lead sludge supply generally equal in composition and properties to the sludge processed in Example I was again provided in the feed hopper 17. A charge of raw sludge was introduced to the chamber 11 and forward movement of the ram 15 was started. Instead of terminating the forward movement when a pressure of 500 pounds was provided, forward movement of the ram 15 was continued, a pressure of 14,500 being used to force the solids through the extrusion die.

In this example, the rate of travel of the ram was equal to the travel rate applied in Example I. In the present instance, however, only about 60 percent as much sludge was processed in a given time as in the procedure used in Example I.

The following example illustrates a process wherein a greater force is employed for the initial deliquefication prior to the extrusion stroke. It shows that even when a somewhat greater amount of solids is accumulated within a given extrusion chamber, all other conditions remaining the same, the extrusion pressure remains constant. In other words, an increase in the quantity of solids within an extrusion chamber does not require a greater pressure for extrusion. The example also shows that the residual liquid content of the extruded product is affected by the extrusion pressure, and that the extrusion pressure is in some direct relation to the extrusion ratio.

*Example III*

A lead sludge supply of the same composition as used in the foregoing examples was provided within the hopper 17, and an initial charge was introduced as before into the chamber 11. An extrusion ratio of 7:1 was again employed. A series of three charges were again provided, but a pressure of approximately 2000 pounds per square inch was applied after each charge. Under this force, a substantial portion of the liquid phases, amounting to about four-fifths of the weight of the liquid phase originally present, was expressed around the peripheral clearance between the ram face and the chamber 11 and also through the die 13. This produced a slightly greater proportion of accumulated solid material within the extrusion chamber 11. This pressure was also insufficient to cause plastic deformation and flow of lead particles through the die 13. A pressure of 14,500 pounds per square inch was provided for the extrusion, as was required in the foregoing examples. The residual liquid content of the extruded lead was about the same as in the foregoing examples.

The following example employs a greater extrusion ratio than the foregoing and required a greater pressure for extrusion.

*Example IV*

Again a lead sludge of the same composition as used in the foregoing examples was provided within the hopper 17 and an initial charge introduced into the chamber 11. A total of three charges were cumulated, a pressure of approximately 500 pounds per square inch, as in Example I, being applied after each charge. The extrusion ratio employed in this instance was 17.5:1. At this extrusion ratio a pressure of 19,000 pounds per square inch was required to extrude the lead particles as cohesive bar-like shapes. The solid bar-like product upon analysis was found to contain only 1.3 percent by weight residual liquid.

The foregoing examples illustrate the application of the process to lead sludges obtained in the production of organo-metallics, and demonstrates the benefits thereof. It will be noted that an increase in the quantity of lead actually extruded, by the present method of providing a series of charges, does not increase the final pressure needed (providing a constant extrusion ratio is used). It is further found that the presence of a minor quantity of an organolead liquid phase is particularly beneficial in permitting relatively moderate pressures for the final extrusion step. In instances wherein the liquid phase consists only of water, however, similar benefits are obtained by providing a plurality of charges, but a higher final pressure is necessary, as shown in the following example.

*Example V*

A supply of sludge, consisting essentially of 90 percent lead and 10 percent water, was provided. The lead particles were from about 0.005 to 0.5 inch in diameter. The sludge supply was maintained in the feed hopper 17 as in previous examples. The extrusion chamber 11 and die 13 provided an extrusion ratio of 12.2:1. A total of three charges in series was provided, a pressure of approximately 500 pounds being applied after each charge. A final pressure of approximately 24,000 pounds was then applied and the extrusion proceeded smoothly and at a uniform speed. The extruded lead product upon analysis was found to contain 0.8 weight percent water. By contrast with Example IV, it is seen that a higher final extrusion pressure is required for this type of sludge.

As in other cases, the embodiment of the present example provides an appreciably higher production rate—of the order of an increase of about 60 percent—over the processing of single charges.

In most instances, as shown by the preceding examples, lead sludge feeds include lead amounting to, usually, at least 80 percent by weight. However, the process is equally as applicable to feeds having an appreciably higher liquid content, as illustrated by the following example, and the production benefits are in fact greater when this type of sludge is used, providing the solids of the sludge are of similar character and size distribution.

*Example VI*

In this example a supply of sludge of the following composition was supplied to the hopper 17:

| | Weight percent |
|---|---|
| Lead particles | 76 |
| Aqueous phase | 12 |
| Tetraethyllead | 12 |

An initial charge was introduced into the chamber 11 and an initial pressure of 500 pounds was applied. Two more charges were similarly fed and pressurized, and then a final pressure of 19,000 pounds was applied to extrude the lead content at an extrusion ratio of 17.7:1. Analysis of the solid bar-like product obtained showed a residual liquid content of 1.4 percent by weight.

The sludge processed in the above example contained an appreciably greater liquid content than, for example, the sludge used in Example I. However, the rate of processing improvement, over the processing rate with single charges, was about the same order of magnitude as the preceding examples. It is found that the weight concentrations, or the corresponding volumetric concentrations, of solids and liquids in the sludge feeds, are not the only factor affecting performance. The susceptibility of sludge to deliquefaction by applying low pressures also appears to vary according to the size distribution and physical character of solids present, some sludges being less susceptible to compaction by low pressure treatment after each of the charges. In all instances, appreciable benefits are provided, however. In cases where several sludges differ only in the volume of liquid phase or phases present in the raw sludge, the maximum benefits are achieved when the sludges with the lower amount of solids are processed. The principal benefit is the rate of production increase over the production possible when processing single charges. Thus, with a sludge of about 70-75 percent by weight lead content, the throughput can be increased as much as 100 percent.

The preceding examples have illustrated the use and benefits of three charges prior to the final extrusion operation, and generally two to five individual charges, serially cumulated, prior to a final extrusion operation, provide the maximum benefits. However, the number of charges cumulated is not restricted to this range, as shown by the following example.

*Example VII*

A sludge corresponding in composition to the sludge used in Example VI was again provided. Instead of using only three serially cumulated charges, however, a total of about thirty were provided, a pressure of 500 pounds being applied after feeding each charge. The quantity of sludge fed with each charge rapidly decreased, owing to the cumulation of solids in the successive charges. After this series of charges, the solids were extruded, using an extrusion ratio of 17.5 and an extrusion pressure of 19,000 pounds. The total liquid content was reduced from about 4 weight percent (before the final high pressure treatment) to only about 1.3 percent. Production benefits similar to those obtained in preceding examples were provided, again owing to the greater rapidity of operation during the feeding of the several charges and the low pressure treatment applied after each charge.

Although most embodiments of the invention will conveniently cumulate the several charges in a single chamber provided with an extrusion die, the process is also fully effective when the initial treatment is carried on in separate chambers and the partly deliquefied solids are then transferred to a separate chamber for the final extrusion, as in the following example.

*Example VIII*

A lead sludge supply of composition equivalent to the sludge used in the preceding example was provided. Three separate charges of equal volume were introduced to separate chambers, and a moderate pressure of 500 pounds is applied to each charge, resulting in removal of a substantial portion of the liquid phase comprising part of the raw sludge. The charges, after this initial low pressure treatment, are sufficiently cohesive in character to retain their shape for a period long enough to allow transfer to an extrusion chamber having a cross section equivalent to that of the pretreating chambers. Three of the pretreated charges are cumulated in a single chamber and then a final pressure of 19,000 pounds is applied to extrude the lead at an extrusion ratio of 17.5:1. The lead extruded has a low liquid content, of the order of about 2 percent or less.

Although the process finds greatest utility in the treatment of high solids-lead sludges produced as byproducts from synthesis of organolead compounds (as in the preceding examples), the method of the invention is equally applicable to sludges having other metals as the solids components. Generally, the process is limited to those sludges wherein the metals are of a malleable character, and further, are deformable, without shattering, at relatively moderate pressures. The following example of the treatment of an aluminum sludge is illustrative.

*Example IX*

A sludge of aluminum and a hydrocarbon liquid, plus minor amounts af alkyl aluminum compounds is available. The particles of aluminum have a size range of from about 0.005 to about 0.05 inch in maximum dimensions. The total liquid phase of the sludge amounts to about 10 weight percent.

A supply of this sludge is maintained in the feed hopper of a suitable apparatus as in the preceding examples. Three serially cumulated charges are fed to the chamber of the apparatus and 500 pounds pressure is applied after each charge. This results in the removal of about three-fourths of the liquid phase present in the raw sludge. A final pressure of approximately 25,000-28,000 pounds is then applied and a cohesive aluminum shape is extruded, an extrusion ratio of 2.7:1 being used. The extruded bar-like product contains below about 2 weight percent liquid.

As an additional example of the applicability of the process of the invention to a different metal containing sludge, the following illustration of the processing of a tin sludge is typical.

*Example X*

A sludge containing finely divided tin particles from an organotin synthesis operation is provided. The sludge contains of the order of 15 percent by weight liquid phase, including several percent alkyl tin halides. Processing this sludge in a manner similar to the operation of the preceding examples provides similar results.

The foregoing examples and description illustrate the wide and flexible applicability of the process of the invention. As demonstrated by the examples, the benefits derived result from the segregation of an appreciable portion of the liquid phase forming part of the raw sludges processed, by the application of only minor pressures thereto. It is found that such minor pressures are readily applied with great rapidity by a variety of devices. Thus, if a hydraulic actuating system is desired, it is feasible to utilize a small diameter hydraulic cylinder piston unit which is capable of quite rapid movement. A double acting piston unit for this purpose provides the desired rapidity in both directions, and the larger hydraulic unit can be deactivated during the pretreating operations. In fact, the linear movement applied to a pretreating-extrusion chamber ram can be 10 to 40 times the rate applied during the final extrusion. Alternative mechanical linkages can be employed to rapidly provide the thrust required for the initial treatment of each of the charges which are cumulated. On the other hand, the final processing step inevitably requires force applied to the pretreated cumulated charges which are of a significantly greater order of magnitude than the force applied for the initial steps. Again, utilizing a hydraulically actuating force system, the force of this magnitude can be achieved conveniently by employing hydraulic cylinder-piston units of relatively large transverse area compared to the transverse area of the charges being processed. Accordingly, this component of a processing cycle is usually of relatively slow character. The technique of the present invention of cumulating a series of charges, at moderate pressure, and then applying a relatively high final extrusion pressure permits a highly effective use of devices capable of this high ultimate pressure.

The force applied in the pretreating operations can, as already indicated, vary considerably. The discovery of the invention resides in the findings that with sludges of the character processed, the solids thereof can be moved closer together, without appreciable deformation, at very modest pressures contrasted to the extrusion pressures subsequently applied. Generally, the pressure employed in the low pressure treatment of the operation charges is from about 300 to about 3,000 pounds per square inch. A more preferred range is from about 500 to about 2,000 pounds. It is found that increments of pressure above 500, in the case of lead solids sludges provide for the removal only of small amounts of the liquid phase. For example, separate portions of a lead sludge, having 12 weight percent aqueous phase and about 5 weight percent tetraethyllead were subjected to the varying pressures, all of which were below the extrusion pressure required for an extrusion ratio of 3.1:1. The portions so treated were analyzed for total liquid residuum, as follows:

| Pressure: | Weight percent residual liquid |
|---|---|
| 500 | 4 |
| 5,000 | 2.7 |
| 10,000 | 2.0 |

It will be noted that multiplying the pressure by a factor of 20 reduced the residual liquid only about one-half. Hence, the pressure of the order of magnitude of about 500 pounds is quite ample for the pretreating operation.

As already indicated, the production improvement effected by the process of the invention arises from the fact that pretreating pressure applications can be provided at a very rapid rate in contrast to the final high pressure extrusion step. The number of serially and cumulated treated charges is not of critical importance, as long as there is a plurality. Generally, at least three cumulated charges is preferred, but the benefits are derived in variable degree throughout the range of 2 to 30, although normally more than 10 charges is undesirable.

The pressure required for the final, or extrusion step is dependent upon the nature of the metal and upon the extrusion ratio. The extrusion pressure required appears to vary approximately as the logarithm of the extrusion ratio, or the extrusion pressure equals a constant times the log of the extrusion ratio wherein the constant is dependent upon the nature of the metal. The extrusion pressure required, for a typical lead sludge, and with an extrusion ratio of about 3:1, is about 11,600 pounds and the extrusion pressure required for an extrusion ratio of about 30 is about 26,400 pounds. The preferred range of extrusion pressures for a lead sludge is from about 11,000 to about 26,000 pounds per square inch.

In every instance there must be some appropriate channels for releasing the liquid from the processed sludge during the pretreating step. A quite satisfactory method is to allow a certain small clearance around the circumference of the ram applying the pressure which permits escape of the liquid.

Minor portions of the liquid, remaining in the cumulated mass after the initial low pressure treatment, accompanies the solid product through the extrusion die as a surface layer. Such liquid can be readily removed and recovered.

Having described the invention fully, what is claimed is:

1. A process for deliquefying a high lead solids content sludge, said sludge comprising finely divided lead solids, an aqueous phase, and liquid tetraethyllead, and formation of a solid lead bar product comprising introducing a plurality of successive charges of said sludge into a chamber having an extrusion opening therefrom, said opening being plugged and closed solely with a process-formed lead shape as hereafter defined; applying a pressure of from about 300 to 3,000 pounds per square inch to each of said successive charges so as to partially deliquefy the sludge without appreciable distortion of the lead particles, and without forcing solids through said extrusion opening, thus accumulating a pressed mass having less liquid phase than the charges, and then applying to said pressed mass a pressure of from 10,000 to about 25,000 pounds per square inch, and forcing a portion only of the pressed solids mass through the extrusion opening and causing plastic deformation of the lead particles and cohesion thereof into a solid bar-like shape, a portion of said shape being retained in said extrusion opening as a sole plug and closure for a following repetition of the process.

2. The process of claim 1 further defined in that the ratio of the cross sectional area of the pressed mass to the lead bar product is from about 3:1 to about 30:1.

References Cited in the file of this patent
UNITED STATES PATENTS

| 1,371,671 | Duryea et al. | Mar. 15, 1921 |
| 2,334,609 | Cox | Nov. 16, 1943 |
| 2,630,623 | Chisholm et al. | Mar. 10, 1953 |
| 2,711,686 | Denison et al. | June 28, 1955 |
| 2,739,526 | Hobbs | Mar. 27, 1956 |
| 2,755,926 | Horn | July 24, 1956 |
| 2,783,499 | Billen | Mar. 5, 1957 |